US009251564B2

(12) United States Patent
Verdier et al.

(10) Patent No.: US 9,251,564 B2
(45) Date of Patent: Feb. 2, 2016

(54) METHOD FOR PROCESSING A STEREOSCOPIC IMAGE COMPRISING A BLACK BAND AND CORRESPONDING DEVICE

(75) Inventors: Alain Verdier, Cesson Sevigne (FR); Philippe Robert, Cesson Sevigne (FR); Cedric Thebault, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 627 days.

(21) Appl. No.: 13/373,000

(22) Filed: Feb. 14, 2012

(65) Prior Publication Data

US 2012/0206569 A1  Aug. 16, 2012

(30) Foreign Application Priority Data

Feb. 15, 2011 (FR) ..................... 11 51203

(51) Int. Cl.
*H04N 13/00* (2006.01)
*H04N 13/02* (2006.01)
*H04N 15/00* (2006.01)
*G06T 3/40* (2006.01)

(52) U.S. Cl.
CPC .......... *G06T 3/4007* (2013.01); *H04N 13/0011* (2013.01); *H04N 13/0018* (2013.01); *H04N 13/0022* (2013.01)

(58) Field of Classification Search
CPC ................................. H04N 13/0011
USPC ............................... 348/42, 43, 56
See application file for complete search history.

(56) References Cited

U.S. PATENT DOCUMENTS

| 5,847,870 | A | 12/1998 | Ohtsuka |
| 6,947,097 | B1 | 9/2005 | Joanblanq |
| 7,679,641 | B2 | 3/2010 | Lipton et al. |
| 8,624,897 | B2 * | 1/2014 | Kim et al. .................... 345/427 |
| 2008/0240549 | A1 | 10/2008 | Koo et al. |
| 2011/0234760 | A1 | 9/2011 | Yang et al. |

FOREIGN PATENT DOCUMENTS

| WO | WO2008038068 | 4/2008 |
| WO | WO2010064774 | 6/2010 |

OTHER PUBLICATIONS

Gunnewiek et al., "How o Disptay 3D Content Realistically", International Workshop on Video Processing and Quality Metrics for Consumer Electronics (VPQM), 2010, Jan. 13, 2010, pp. 1-6.
Izquierdo et al., "tmage-Based Rendering and 3D Modeling: A Complete Framework", Signal Processing, Image Communication, vol. 15, No. 10. Apr. 1, 2000, pp. 817-858.

(Continued)

*Primary Examiner* — Geepy Pe
(74) *Attorney, Agent, or Firm* — Tutunjian & Bitetto, P.C.

(57) ABSTRACT

A method for processing a stereoscopic image that includes a first image and a second image that has at least one first black band. To reduce the display errors linked to black bands, the method estimating at least one first parameter representative of the at least one first black band generating a third image from the stereoscopic image by disparity compensated interpolation. The third image includes at least one second black band, with at least one second parameter representative of the at least one black band being a function of at least one first parameter. The invention also relates to a corresponding stereoscopic image processing module and a display device including the processing module.

15 Claims, 6 Drawing Sheets

(56) References Cited

OTHER PUBLICATIONS

Figure 1:
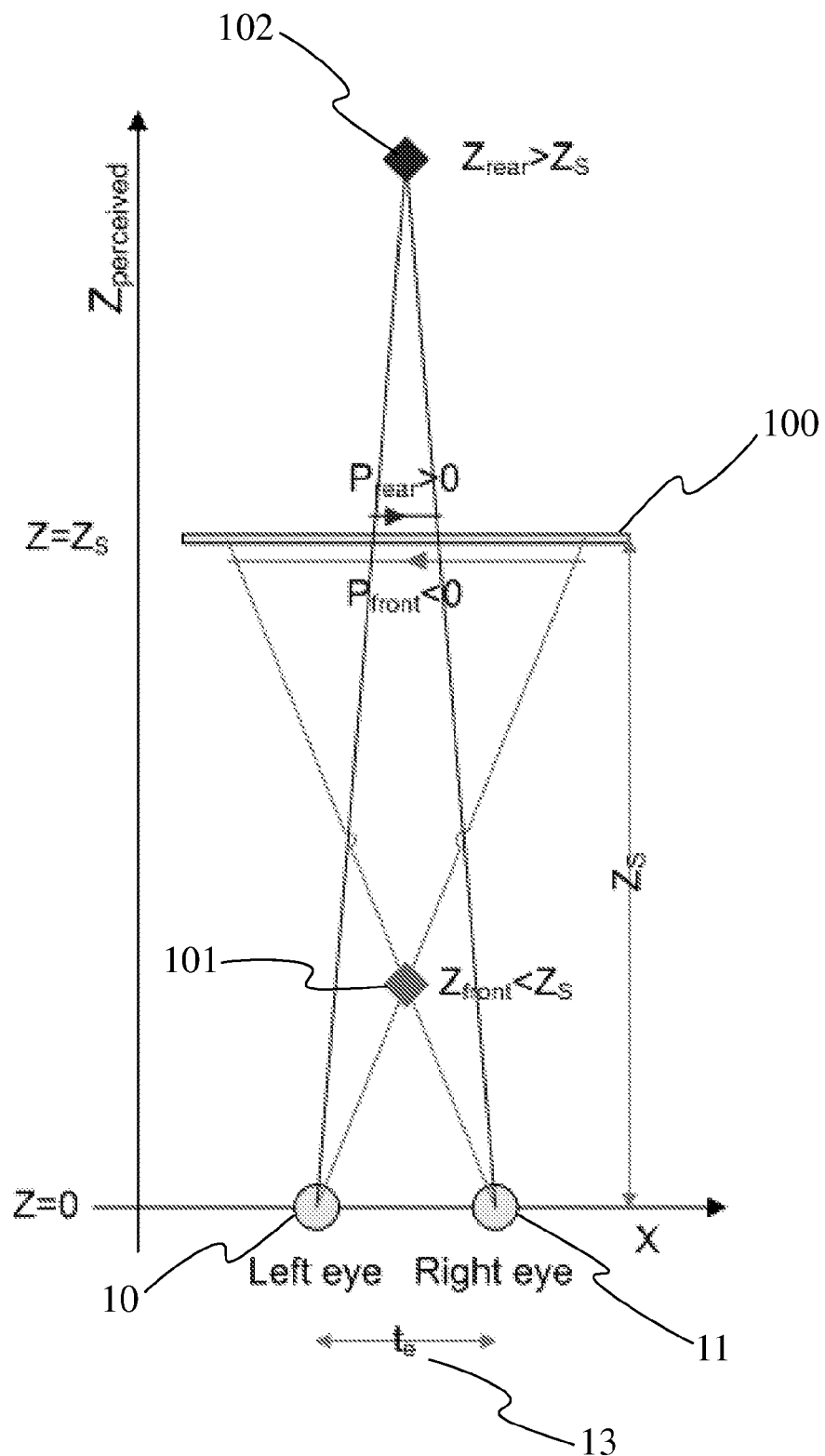

Konrad, "View Reconstruction for 3-D Video Entertainment: Issues, Algorithms and Applications", Image Processing and its Applications, 1999, Seventh International Conference, Jul. 1999, vol. 1, Jul. 13, 19999, pp. 8-12.
French Search Report dated Sep. 8, 2011.
Redert, Andre et al., "An Efficient Disparity Map Format for Real Time Interpolation in Multi Viewpoint Stereoscopic Video Systems", Proc. of Inter. Workshop on Synthetic-Natural Hybrid Coding and Three Dimensional Imaging, Rhodes Greece, (Sep. 5-9, 1997), pp. 155-158.
Devisme et al., "Stereoscopic Depth Perception in Peripheral Field and Global Processing of Horizontal Disparity Gradient Pattern", Vision Research, vol. 48, 2008, pp. 753-764.
Kojima et al., "Role of Spatial and Temporal Coincidence in Depth Organization", Perception, vol. 27, 1998, pp. 541-552.

* cited by examiner

METHOD FOR PROCESSING A STEREOSCOPIC IMAGE COMPRISING A BLACK BAND AND CORRESPONDING DEVICE

This application claims the benefit, under 35 U.S.C. §119 of FR Patent Application 1151203 filed 15 Feb. 2011.

1. DOMAIN OF THE INVENTION

The invention relates to the domain of image or video processing and more specifically to the processing of three-dimensional (3D) images and/or video. The invention also relates to the domain of image interpolation with disparity compensation.

2. PRIOR ART

According to the prior art, there are several methods used in video processing to restore a perception of relief, for example there is stereoscopy. In stereoscopy, two views of a same scene (also called right image and left image) are recorded, with two different video cameras or two different still cameras, from two different viewpoints laterally offset with respect to one another. These two views of the same scene are displayed on a display device (for example a screen of PDP (Plasma Display Panel) type, of LCD (Liquid Crystal Display) type, or by means of a video-projector) either in a temporally sequential way (left image then right image and so on) or in a spatially interlaced way (left image line (or column) then right image line (or column) and so on) to restore the perception of relief, that is to say the depth information. The amplitude of a 3D effect or the perception of a relief in a 3D image directly depends on the disparity of left and right images, that is to say on the distance (that can be measured in number of pixels for example) separating two pixels, that is to say a pixel for the left image and a pixel of the right image, representing a same item of video information at the level of the display device, that is to say representing the same element of the recorded scene. The disparity of left and right images of a film or video is decided by the director and corresponds to the distance separating left and right cameras filming the scene, these two cameras being for example separated by a distance equal to 6.5 cm that corresponds to the average distance separating the eyes of an individual.

The chosen distance separating the cameras corresponding to an average, the need to adapt the disparity, that is to say to adapt the amplitude of 3D effects, is felt so that each individual that views a 3D film or image is able to adapt the disparity of left and right images forming a stereoscopic 3D image to his view to avoid or diminish visual fatigue. Moreover, significant 3D effects can disturb some spectators that then try to adjust the amplitude of 3D effects, that is to say, to set the depth of images. In the same way, the amplitude of 3D effects selected by the director at the generation of the film or video is adapted for a given screen size, for example a cinema screen, and the need to adapt the disparity is felt when the film is displayed on a screen of a different size to that of the screen for which it was intended, for example a screen of a smaller size.

In order to adapt the disparity, it is known in the art to use the technique of view interpolation with disparity compensation. According to this technique, at least one of two images (left or right) forming the stereoscopic image is replaced by a new image obtained by interpolation from two original images, the disparity between the interpolated image replacing one of the two original images (for example the right image) and the other original image (for example the left image) being for example less than the disparity between the two original images. One of the problems encountered during the interpolation is linked to the presence of one or several lateral black bands on one or both of the original left and right images. In fact, the zones of the image on both sides of the black bands are zones where the estimated items of disparity information are often erroneous, this results in errors in view interpolation which is based on this disparity information.

3. SUMMARY OF THE INVENTION

The purpose of the invention is to overcome at least one of these disadvantages of the prior art.

More specifically, the purpose of the invention is notably to reduce the defects of stereoscopic displaying of sequences comprising one or several black bands.

The invention relates to a method for processing a stereoscopic image, the stereoscopic image comprising a first image and a second image, at least one image among the first and second images comprising at least one first black band. In order to reduce the display faults linked to the at least one first black band, the method comprises steps for:
  estimation of at least one first parameter representative of the at least one first black band,
  generation of a third image from the stereoscopic image by disparity compensated interpolation, the third image comprising at least a second black band, at least one second parameter representative of the at least one black band being a function of at least one first parameter.

According to a particular characteristic, the step of generation of the third image comprises a step of determination of an item of information representative of the disparity between the first image and the second image.

Advantageously, the item of information representative of disparity is determined according to at least on first estimated parameter.

According to a specific characteristic, the first image, the second image and the third image each comprise a useful part, the useful part of the third image being generated by disparity compensated interpolation from useful parts of said first and second images, the useful part of an image corresponding to the image from which all black bands have been removed.

Advantageously, the at least one second parameter is a function of an item of information representative of an interpolation position between the first and second images.

According to another characteristic, the at least one first parameter and the at least one second parameter belong to a set of parameters comprising:
  a parameter representative of the width of the black band in an image, and
  a parameter representative of the video value of pixels belonging to a black band in an image.

The invention also relates to a module for processing a stereoscopic image, said stereoscopic image comprising a first image and a second image, at least one image among the first and second images comprising at least one first black band, the module comprising:
  means for estimation of at least one first parameter representative of the at least one first black band,
  means for generation of a third image from the stereoscopic image, the third image comprising at least a second black band, at least a second parameter representative of the at least one black band being a function of at least one first parameter.

Advantageously, the module also comprises means for determining an item of information representative of the disparity between the first image and the second image.

The invention also relates to a display device comprising a module for processing a stereoscopic image.

4. LIST OF FIGURES

Figure 2:
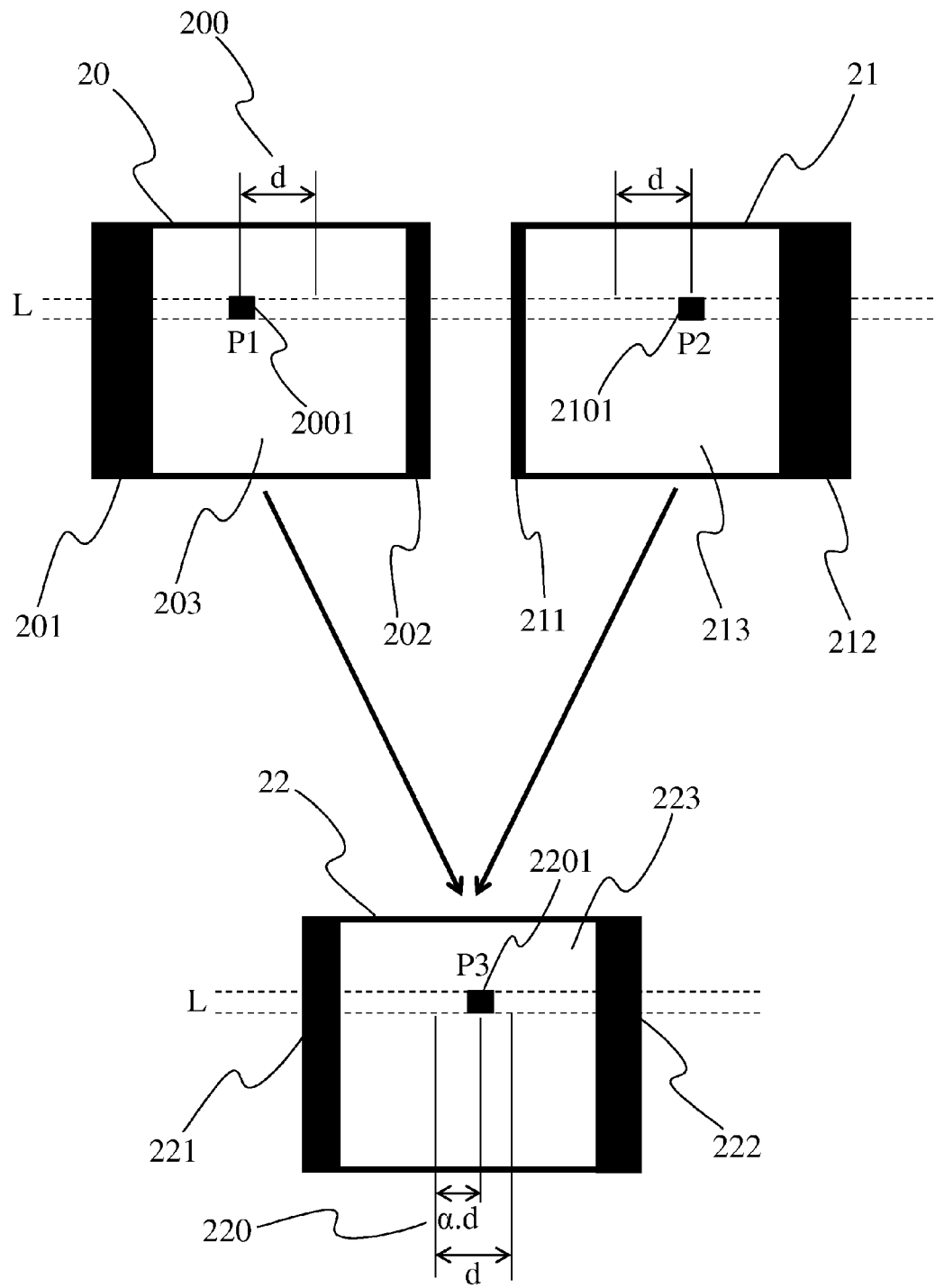
Figure 3:
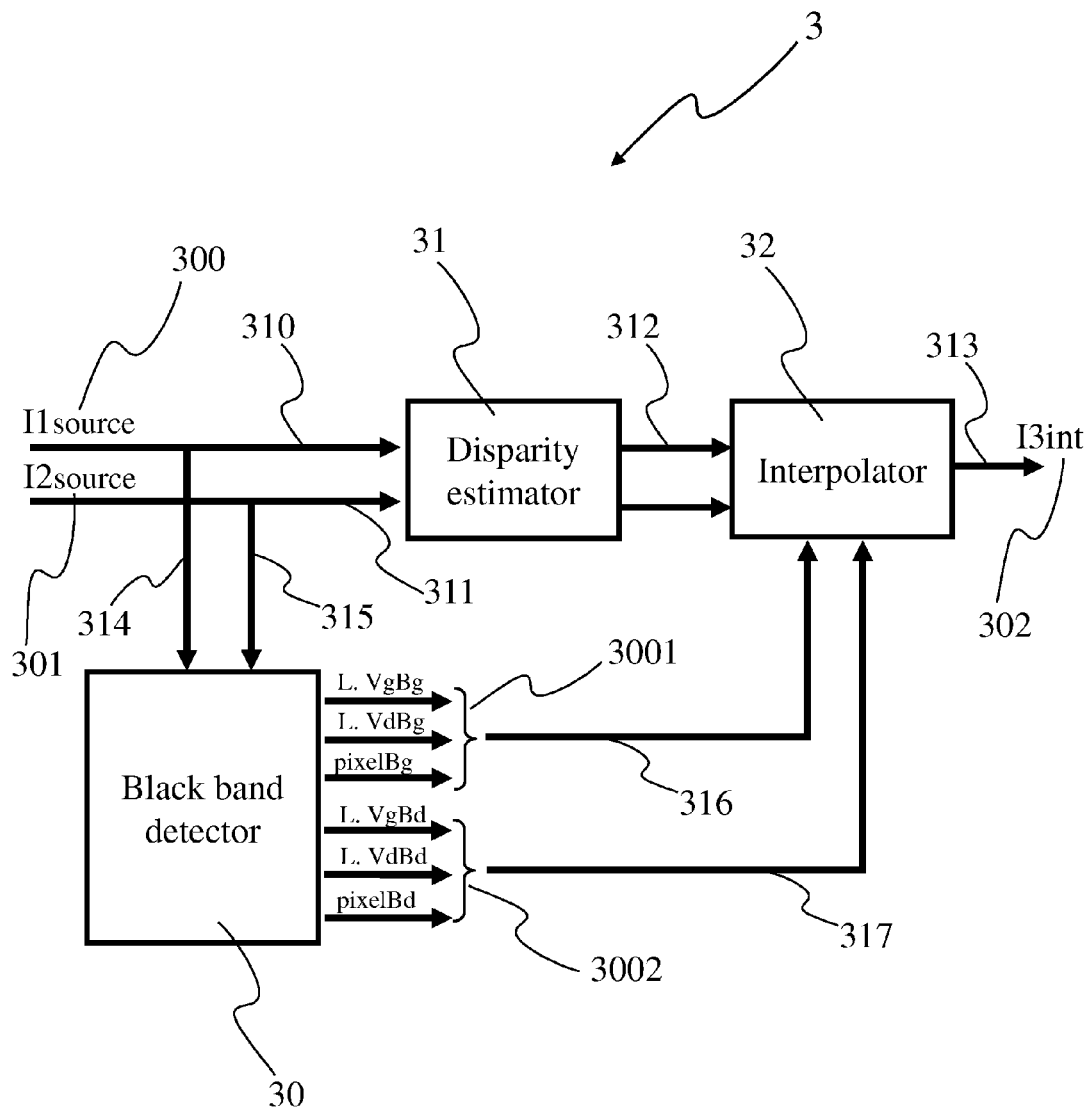
Figure 4:
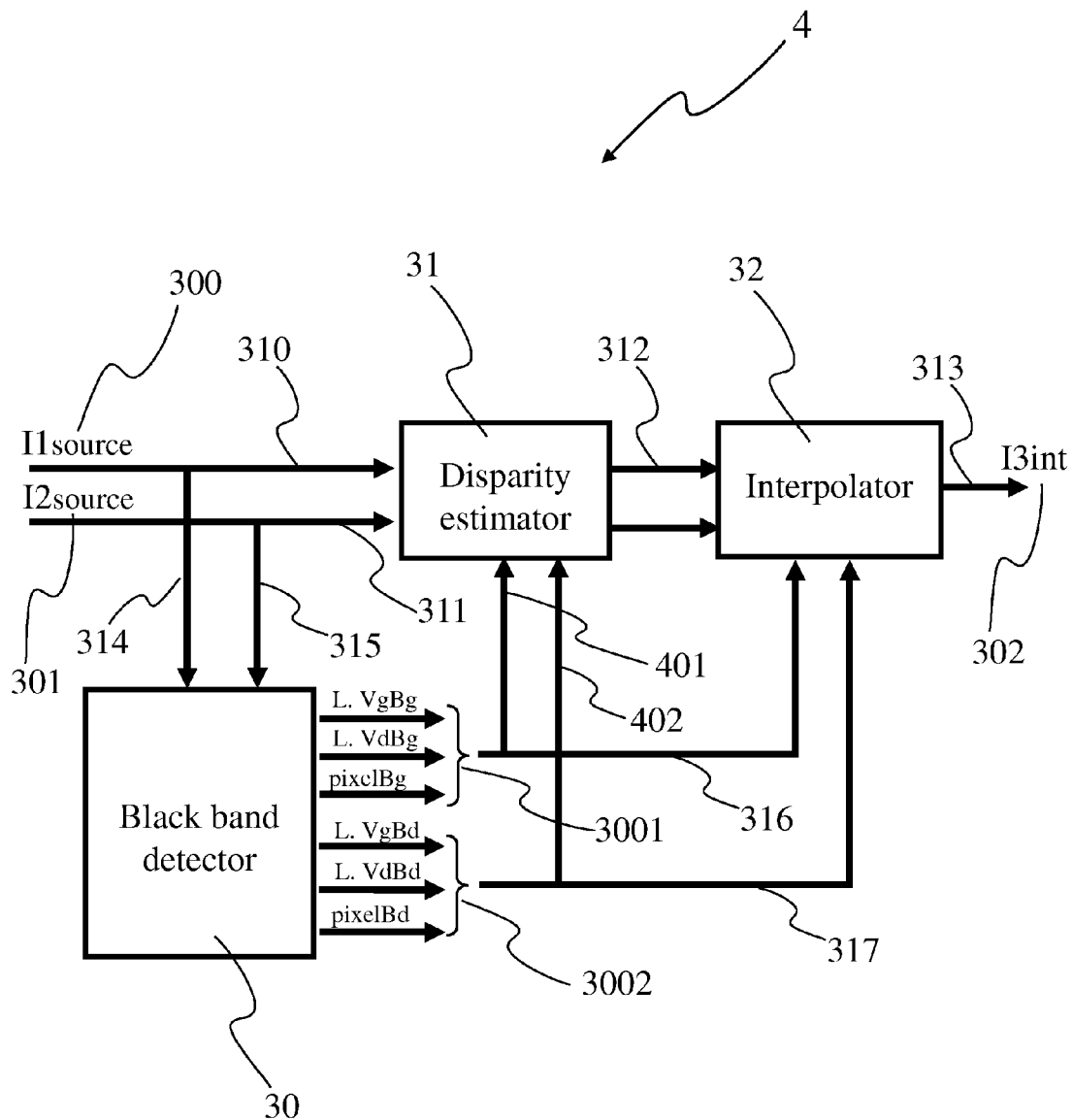
Figure 5:
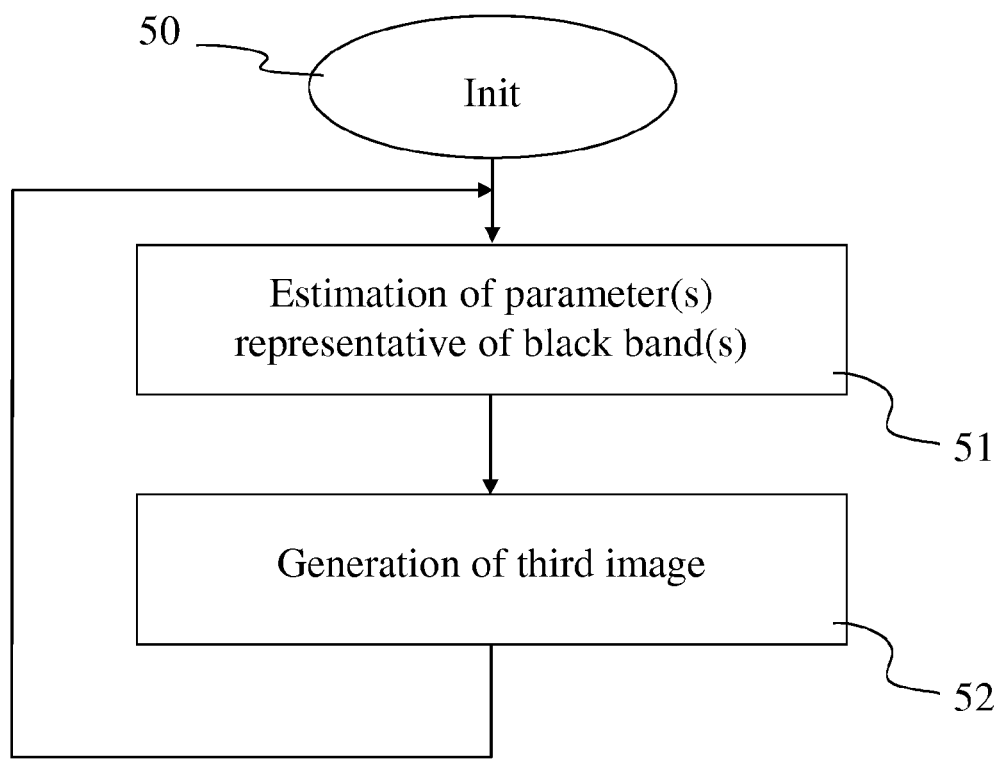
Figure 6:
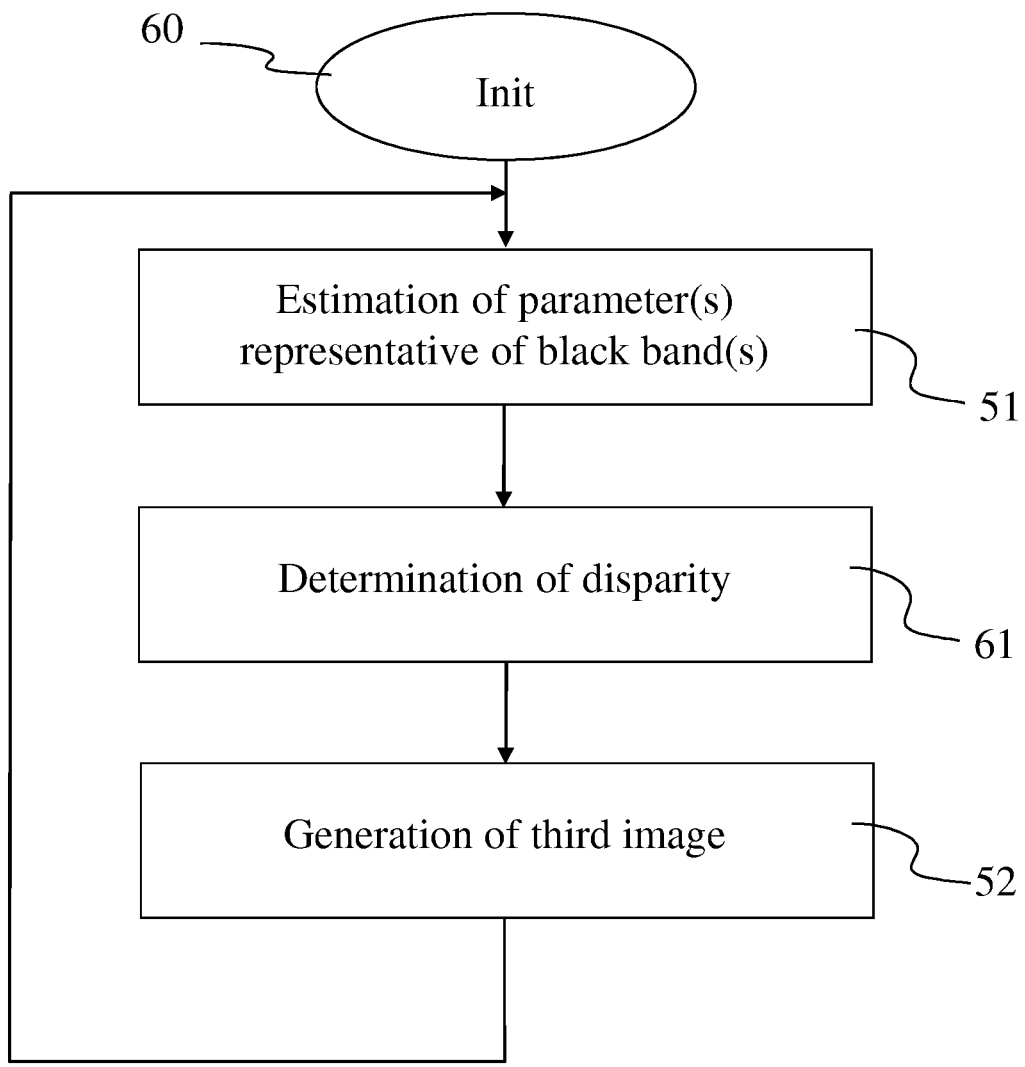

The invention will be better understood, and other specific features and advantages will emerge upon reading the following description, the description making reference to the annexed drawings wherein:

FIG. 1 shows the perception of depth and parallax perception by a spectator, according to a particular example of the prior art, FIG. 2 shows a method for disparity compensated interpolation of a stereoscopic image, according to a particular embodiment of the invention, FIG. 3 diagrammatically shows the structure of a processing unit of a stereoscopic image of FIG. 2, according to a particular embodiment of the invention, FIG. 4 diagrammatically shows the structure of a processing unit of a stereoscopic image of FIG. 2, according to a second particular embodiment of the invention, FIGS. 5 and 6 show a method for processing a stereoscopic image of FIG. 2 implemented in a processing unit of FIG. 3 or of FIG. 4, according to two particular embodiments of the invention.

5. DETAILED DESCRIPTION OF EMBODIMENTS OF THE INVENTION

FIG. 1 shows the relationship between the depth perceived by a spectator and the parallax effect between the left and right images viewed by respectively the left eye 10 and the right eye 11 of the spectator looking at a display device or screen 100. In the case of a temporal sequential display of left and right images representative of a same scene according to two different viewpoints (for example captured by two cameras laterally offset from one another by a distance for example equal to 6.5 cm), the spectator is equipped with active glasses for which the left eye occultation and right eye occultation are synchronized respectively with the display of right and left images on an LCD or plasma type screen display device for example. Due to these glasses, the right eye of the spectator only sees the displayed right images and the left eye only sees the left images. In the case of a spatially interlaced left and right images display, the lines of left and right images are interlaced on the display device in the following manner: one line of the left image then one line of the right image (each line comprising pixels representative of the same elements of the scene filmed by the two cameras) then one line of the left image then one line of the right image and so on. In the case of a display of interlaced lines, the spectator wears passive glasses that enable the right eye to only see the right lines and the left eye to only see the left lines. In this case, the right lines will be polarized according to a first direction and the left lines according to a second direction, the left and right lenses of passive glasses being polarized as a consequence so that the left lens allows the displayed information on the left lines to pass and so that the right lens allows displayed information on the right lines to pass. FIG. 1 shows a display screen or device 100 situated at a distance or depth Zs from a spectator, or more specifically from the orthogonal plane to the viewing direction of the right eye 11 and the left eye 10 of the spectator and comprising the right and left eyes. The reference of the depth, that is to say Z=0, is formed by the eyes 10 and 11 of the spectator. Two objects 101 and 102 are viewed by the eyes of the spectator, the first object 101 being at a depth of $Z_{front}$ less than that of the screen 1 100 ($Z_{front}$<Zs) and the second object 102 at a depth $Z_{rear}$ greater than that of the screen 100 ($Z_{rear}$>Zs). In other words, the object 101 is seen in the foreground with respect to the screen 100. So that an object is seen in the background with respect to the screen, it is necessary that the left pixels of the left image and the right pixels of the right image representing this object have a positive disparity, that is to say that the difference of position in X of the display of this object on the screen 100 between the left and right images is positive. This position difference in X on the screen of left and right pixels representing a same object on the left and right images corresponds to the level of parallax between the left and right images. The relationship between the depth perceived by the spectator of objects displayed on the screen 100, the parallax and the distance to the screen of the spectator is expressed by the following equations:

$$Z_p = \frac{Z_z * t_e}{t_e - P} \qquad \text{Equation 1}$$

$$P = \frac{W_z}{N_{col}} * d \qquad \text{Equation 2}$$

in which $Z_P$ is the perceived depth (in meters, m),

P is the parallax between the left and right images (in meters, m), d is the transmitted disparity information (in pixels), $t_e$ is the inter-ocular distance (in meters, m), $Z_s$ is the distance between the spectator and the screen (in meters, m), $W_s$ is the width of the screen (in meters, m), $N_{col}$ is the number of columns of the display device (in pixels).

Equation 2 enables a disparity (in pixels) to be converted into parallax (in meters).

FIG. 2 shows a method for disparity compensated interpolation of an image interpolated 22 from a first image 20 and a second image 21 forming a stereoscopic image, according to a particular and non-restrictive embodiment of the invention. The first image 20 and the second image 21 forming the stereoscopic image advantageously corresponding to two different viewpoints of a same scene, the two viewpoints being spatially offset. The first image 20 corresponds for example to the left image of the scene that will be seen only by the left eye 10 of a spectator and the second image 21 corresponds for example to the right image of the scene that will be seen only by the right eye 11 of the spectator, the difference between the two left and right viewpoints of the scene resulting in a parallax effect at the origin of the perception of depth in the stereoscopic image. The amplitude of a 3D (that is to say three-dimensional) effect that corresponds to the perception of depth in a 3D image depends on the amplitude of the parallax effect that is directly linked to the disparity between the first image 20 and the second image 21. The disparity corresponds to the distance that can be measured in number of pixels separating two pixels (a first pixel in the first image and a second pixel in the second image) that represent a same item of video information, that is to say a same point of the scene shown in the first and second images. Typically it is supposed that the two pixels are corresponding or that the second pixel 2101 of the second image 21 is the corresponding pixel to the first pixel 2001 of the first image 20 because they both represent a same point of the scene. The disparity d 200 associated with the pixels 2001 and 2101 corresponds to the number of pixels separating the pixels 2001 and 2101 that belong to a same line L, that is to say the difference between the column number to which belongs the second pixel 2101 and the column number to which belongs the first pixel 2001, the two images 20 and 21 having the same column number, the first column being situated left of the images 20 and 21.

The second image 21 advantageously comprises a first lateral black band 211 situated left of the second image 21 and a second lateral black band 212 situated right of the second image 21. Each of these black bands 201, 202, 211 and 212 is advantageously defined by a parameter corresponding to the width in pixels of the black band. According to a variant, each black band is defined by an additional parameter corresponding to the video information (that is to say grey level) of pixels forming the black band, the pixels forming a black band having a grey level representative of the tone black (grey level equal to 0 for example in an image where the grey levels are comprised between 0 and 255) or a tone approaching black (grey level equal to 5, 10 or 15 for example in a image where the grey levels are comprised between 0 and 255). In the first image 20, the part of the image 203 comprised between the left black band 201 and the right black band 202 corresponds to the useful part of the first image 20, that is to say the part comprising useful video information of the first image, that is to say the part comprising video information representative of the captured scene. In the second image 21, the part of the image 213 comprised between the left black band 211 and the right black band 212 corresponds to the useful part of the second image 21, that is to say the part comprising the useful video information of the second image 21. The black bands of each of the images 20 and 21 are advantageously added before display of images on an image device, for example to be able to display the images on different devices having different screen formats, that is to say ratios between height and width of different screens (for example 4/3 or 16/9). Black bands are added to overcome some stereoscopic image display problems comprising window errors, that is to say errors linked to the display of one or several objects of the image having a depth less than that of the display screen (also called pop-up objects) and for which a part is cut-off by the borders of the image. This type of object causes discomfort for the spectator who receives two items of contradictory information: the spectator perceives the object in a plane situated in front of the screen plane though the object is cut by the border of the screen situated by definition in the screen plane. To overcome window error problems, a black band is inserted in the image at the image border where the error appears so that the objects of the foreground exit the screen at the same instant on the border (right or left) of the first image 20 as on the same border (respectively right or left) of the second image 21. This means that a virtual window is created at the level of the object closest to the spectator (that is to say the object having the smallest depth) this virtual window being referred to as the "floating window". An example of insertion of a floating window in a 3D video content is described in the U.S. Pat. No. 5,847,870 published 8 Dec. 1998.

Advantageously, the left black bands 201 and 211 of the first image 20 and of the second image have different widths and the right black bands of the first image 20 and of the second image 21 have different widths. According to a variant, the left black bands 201 and 211 are of the same width and/or the right black bands 202 and 212 have the same width.

According to another variant, the first image 20 comprises a single black band, for example the left black band 201 or the right black band 202. According to another variant, the second image 21 comprises a single black band, for example the left black band 211 or the right black band 212. In summary, at least one of the two images 20 and 21 comprises at least one black band 201, 202, 211, 212.

Advantageously, the black bands 201, 202, 211 and 212 of the first and second images 20 and 21 have a rectangular form, that is to say that the width of a black band is constant over all the lines of an image. According to a variant, the black bands 201, 202, 211 and 212 have a trapezoidal type form, that is to say the black band at the top of the image is greater in width than the width of the black band at the bottom of the image, or conversely, the variation in width from one line to another of the image being linear. According to another variant, the form of black bands 201, 202, 211 and 212 can be anything, for example they can be in the form of waves, that is to say that the width of the black band varies from one line to another or from one group of lines to another group of lines.

A third image 22 is generated from first 20 and second 21 images forming the stereoscopic image. This third image 22 is advantageously obtained via disparity compensated interpolation from the first image 20 and the second image 21. The image interpolation with disparity maps (a disparity maps corresponds to a map formed of a disparity value associated with each pixel of an image) consists in interpolation of an intermediary image from one or several reference images taking into account the disparity of pixels between the images. In fact, as described in regard to FIG. 1, a stereoscopic image displayed on a screen 2 is obtained by combination of a left image and a right image, the left and right images being representative of a same scene but with two different viewpoints. The result is that a same object viewed on the left and right images appears on each of these images but with a different spatial position on each image. The captured object thus appears on the right image with a given position at x and the same image appears on the left image with a position at x offset by several pixels. This spatial shift corresponds to the disparity of the stereoscopic image resulting from the combination of right and left images, a combination made by the human brain and enabling the relief to be perceived. Thus, starting from a left reference image (or from a right reference image) of a pair of right and left reference images, it is possible to generate a new left image (respectively a new right image) by interpolation with a modified disparity. The combination of the new generated left image (or respectively the new generated right image) with the reference right image (respectively with the reference left image) enables a resulting stereoscopic image to be obtained with depth information (associated with the disparity) modified as a consequence. Due to the third image generated, it is possible to form a new stereoscopic image, formed from one of two reference images (the reference images corresponding to the first image 20 and the second image 21 of FIG. 2) and the third image 22 that replaces the other two initial images. For example, the new stereoscopic image is formed using the first image 20 and the third image 22 that replaces the second image 21. According to another example, the new stereoscopic image is formed using the second image 21 and the third image 22 that replaces the first image 21. According to a variant, two third images are generated from first 20 and second 21 images, one of the two third images replacing the first image 21 and the other of the two third images replacing the second image 21 to form a new stereoscopic image. The image interpolation requires the projection of the first image 20 or of the second image 21, also called reference images onto the third image 22, called the interpolated image, along the disparity vectors that connect the first 20 and second 21 reference images. In order to obtain the interpolated pixel 2201 of the third image 22 by interpolation of the first pixel 2001 of the first image 20, it is necessary to calculate the disparity map for the third image 22 by projecting the complete disparity map of the first image 20 onto the third image 22 and assigning the disparity value to the pixels of the third image 22. The calculation of the disparity map is carried out for a number of pixels representative of the first image 20 less than or equal to the total number of pixels of the first image 20. The first pixel 2011 of the first image 20 has the disparity value of d(P1). The corresponding second pixel 2101 in the second image 21 is defined by P1+d(P1) and is located on the same line L (there is no vertical displacement). The corresponding pixel 2201 in the third image 22 is defined by P1+α.d(P1), where the factor α is advantageously comprised between 0 and 1. Once the disparity map has been obtained for the third interpolated image 22, an inter-image interpolation (that is to say between the first image 20 and the second image 21) is implemented along the disparity vectors to obtain grey level values to be assigned to pixels (for example the pixel 2201) of the third interpolated image 22.

The third interpolated image 22 comprises a left black band 221 and a right black band 222. The left black band 221 is advantageously determined by taking into account the parameters relating to the width of the left black band 201 of the first image 20 and to the width of the left black band 211 of the second image 21. If the width of the left black band 201 is for example 30 pixels, if the width of the left black band 211 is for example 10 pixels and if the factor α is for example 0.5 then the width of the left black band will be (1−0.5)*30+0.5*10, or 20 pixels. In the same way, the right black band 222 of the third image 22 is determined by taking into account the parameter representative if the width of each of the right black bands 202, 212 of the first image 20 and the second image 21. The equation enabling determination of the width of each of the black bands of the image interpolated from reference images (that is to say the first and second images), is the following:

$$\text{Width } ViBx=(1-\alpha)*\text{Width } VgBx+\alpha*\text{Width } VdBx \qquad \text{Equation 3}$$

Where:
x is left or right, Bx thus signifying left Band or right Band according to the case,
ViBx signifies Band x (left or right) interpolated view,
VgBx signifies Band x (left or right) left view, and
VdBx signifies Band x (left or right) right view.

According to a variant, the width of the line also depends on the line of the image, for example when the black band is not rectangular, the width of the black band varying from one line to another of the image or from one group of several lines to another group of several lines of the image.

Once the width of the black bands 221 and 222 of the third image has been determined from black bands of the first and second images, the insertion of black bands 221 and 222 with appropriate widths is forced in the third image 22. It is thus no longer necessary to determine the black bands of the third image by interpolation, which offers the advantage of avoiding any problems linked to the interpolation of black bands. The black bands inserted by forcing and determined from black bands of the first and second images offer for example the advantage of having borders that are clear and/or straight, that is to say the vertical frontier between the black band (left 221 or right 222) on one hand and the useful part 223 of the third image 22 is clear, no black point extending from the black band into the useful part and no point of the useful part extending into the black band, which occurs when black bands of the interpolated image are determined by interpolation from reference images including the black bands of the reference images. According to an embodiment of the invention described with respect to FIG. 2, the disparity compensated interpolation from first and second images to obtain the third image is only done using useful parts (respectively 203 and 213) of each of the first 20 and second 21 images to obtain the useful part 223 of the third interpolated image 22.

According to a variant, a parameter representative of the video value of pixels forming the left 221 and right 222 black bands of the third interpolated image 21 is determined from a parameter representative of the video value of pixels of left 201, 211 and right 202, 212 black bands of respectively the first image 20 and the second image 21 in a similar way as for the determination of their width. The equation enabling the video value to be determined for each pixel of the black bands of the third image is the following:

$$\text{Value } ViBx=(1-\alpha)*\text{Value } VgBx+\alpha*\text{Value } VdBx \qquad \text{Equation 4}$$

Where:
x is left or right, Bx thus signifying left Band or right Band according to the case,
ViBx signifies Band x (left or right) interpolated view,
VgBx signifies Band x (left or right) left view, and
VdBx signifies Band x (left or right) right view.

According to another variant, the video value of black bands of the third image 22 is forced to a determined value, for example 0, 5 or 10 if the scale of the grey levels of the image extends from 0 to 255.

FIG. 3 diagrammatically shows a first hardware embodiment of an image processing unit 3, according to a particular and non-restrictive embodiment of the invention. The processing unit 3 takes for example the form of a programmable logical circuit of type FPGA (Field-Programmable Gate Array) for example, ASIC (Application-Specific Integrated Circuit) or a DSP (Digital Signal Processor).

The processing unit 3 comprises the following elements:
a black band detector 30,
a disparity estimator 31,
an interpolator 32, and
data buses 310, 311, 312, 313, 314, 315, 316 and 317.

A first signal $I1_{reference}$ 300 representative of the first image 20 and a second signal $I2_{reference}$ 301 representative of the second image 21, for example acquired by respectively a first acquisition device and a second acquisition device, are supplied at input to the processing unit 3 to a black band detector 30 via two data buses 314 and 315 on one hand and to a disparity estimator 31 via two data buses 310 and 311 on the other hand. For each black band of the first image 20 and of the second image 21, the black band detector 31 estimates the first parameters representative of black bands, for example an item of information representative of the width of black bands and an item of information representative of the video value of pixels comprising the black bands. At the output of the black band detector 30 are found first parameters 3001 representative of the left band of each reference image 20 and 21 and first parameters 3002 representative of the right band of each reference image 20 and 21. These first parameters 3001 and 3002 are transmitted to an interpolator 32 via respectively the data bus 316 and the data bus 317. From the first signal $I1_{reference}$ 300 and the second signal $I2_{reference}$ 301, the disparity estimator determines a disparity map associated with one of the reference images 20 and 21. The information representative of the disparity map is then transmitted to the interpolator 32 via the data bus 312, as well as the first signal $I1_{reference}$ 300 and the second signal $I2_{reference}$ 301. The interpolator generates the third image 22 from the two reference images 20 and 21 and inserts into this third image 22 left and right black bands using second parameters representing them. These second parameters correspond for example to the width of each of the left and right bands of the third image 22 determined from width information of left and right black bands of reference images 20 and 21 and to the video value of pixels of left and right black bands of the third image 22 determined from the video value of left and right black bands of reference images 20 and 21. At the output of the interpolator 32 is found a third signal $I3_{int}$ 302 representative of the third interpolated image 22, for which the useful part was estimated by disparity compensated interpolation from useful parts of each of the first and second images and for which the second parameters representative of black bands were determined from first parameters 3001 and 3002 representative of left and right black bands of first 20 and second 21 images. The third signal 302 is then transmitted with at least one of the two entry signals 300 and 301 (or with a second third signal in the case where each of the entry images is replaced by an interpolated image) to a display device (not shown) for the display of a stereoscopic image with depth information modified with respect to the entry stereoscopic image formed from first 20 ands second 21 images. The processing unit advantageously comprises one or several memories (for example of RAM (Random Access Memory) or flash type) able to memorise one or several reference images and a synchronisation unit enabling the transmission of the reference image memorised and the transmission of the third image to the display device for the display of the new stereoscopic image, to be synchronised for which the disparity was modified.

According to a variant, the black band detector 30 only detects the video value of pixels forming black bands of reference images 20 and 21, notably in the case where the video value of pixels of black bands of the third image is forced to a predetermined value.

According to another variant, the processing unit 3 does not comprise a disparity estimator. According to this variant, the interpolator receives the signals of reference images 300 and 301, an item of information representative of the disparity map comprising disparity information between the first image 20 and the second image 21 for all or some of the pixels of the first image 20 being associated with the first signal $I1_{reference}$ 300. According to a variant, an item of information representative of the disparity map is associated with the second signal $I2_{reference}$ 301, the disparity map representing the disparity between the pixels of the second image 21 and those of the first image 20. According to another variant, the first signal 300 and the second signal 301 are each associated with an item of information representative of a disparity map.

FIG. 4 diagrammatically shows a second hardware embodiment of an image processing unit 4, according to a particular and non-restrictive embodiment of the invention. The image processing unit 4 comprises the same elements as the processing unit 3 of FIG. 3, the references of identical elements in the two FIGS. 3 and 4 being identical. The difference between the processing unit 4 and the processing unit 3 is that in the processing unit 4, the first parameters 3001 and 3002 representative of black bands of first 20 and second 21 images are transmitted to the disparity estimator via the intermediary of one or several data buses 401, 402. Advantageously, the disparity estimator 31 uses the parametere representative of black bands of reference images in order to not take account of the black bands in the estimation of disparity between the first image 20 and the second image 21. Thus, the disparity estimator estimates disparity only over the useful part 203, 213 of each of the reference images 20, 21. Not taking account of the black bands for disparity estimation offers the advantage of not placing in correspondence by mistake a pixel of a black band of a first image with a pixel of the useful part of the second image (for which the video value may be close to that of the pixel of the black band), which generates errors at the level of estimation of disparity associated with this pixel of the first image for example. By avoiding this type of error, echoes of the black band are avoided in the useful part of the interpolated image, that is to say the appearance of "black" pixels (for which the video value is close to black) is avoided in the useful part of the interpolated image, that is to say the third image 22.

According to a variant, the disparity of black bands is forced at the output of the disparity estimator with the following values:

Left black band disparity=Width $VdBg$–Width $VgBg$     Equation 5

Right black band disparity=Width $VdBd$–Width $VgBd$     Equation 6 with VdBg signifying left Band of the right View (right view corresponding to the first image 20 for example), VgBg signifying left Band of the left View (left view corresponding to the second image 21 for example), VdBd signifying right Band of the right View and VgBd signifying right Band of the Left view.

According to another variant, the borders of images are initialised with the disparity of black bands (estimated from preceding equations 5 and 6), the disparity estimator operating then over the whole image (black bands+useful part) without generating disparity estimation errors linked to the presence of black bands.

In any case, the taking into account of parameters representative of black bands of reference images enables a disparity map without errors linked to the presence of black bands to be produced at the interpolator 32. The echoes in the useful part of the third image generated by disparity compensated interpolation are thus largely reduced, even totally eradicated. In the same way, echoes of the useful part in the black bands (brighter pixels, resulting from a poor association of pixels of the first and second images in the disparity estimation, in the black bands, that is to say video value carrying pixels of the useful part in the black bands) are also avoided.

FIG. 5 shows a method for processing a stereoscopic image implemented in a processing unit 3 or 4, according to a first non-restrictive particularly advantageous embodiment of the invention.

During an initialisation step 50, the different parameters of the processing unit are updated.

Then, during a step 51, a first parameter representative of a first black band of the stereoscopic image is estimated. The stereoscopic image comprises a first image 20, for example an image representative of a scene acquired according to a first viewpoint corresponding to the left view of the scene and a second image 21, for example an image representative of the same scene as the first image 20 but acquired according to a second viewpoint different from the first viewpoint corresponding to the right view of the scene. The first image 20 and the second image 21 forming the stereoscopic image are also called reference images. At least one of the reference images comprises a first black band, for example the first image comprises a first black band situated on the left of the image. According to another example, each reference image comprises a first black band, right or left of the image. According to another example, each reference image comprises a first left black band and a first right black band situated respectively right and left of the reference image. During step 51, a first parameter is estimated for each first black band, for example a first parameter for the first left black band of the first image, a first parameter for the first right black band of the first image, a first parameter for a first left black band of the second image and a first parameter for the first right black band of the second image. The first parameter corresponds advantageously to the width in pixels of the first black band when this latter has a constant width for the full height of the image. When the width of a black band is not constant for the whole height of the image, the first parameter corresponds to a plurality of widths in pixels of the first black band, the number of width depending on the form of the black band. According to a variant, the first parameter corresponds to the position of the first black band in the image, for example a column index if it is considered that the image corresponds to a matrix of I lines*m columns. According to this variant, the column index indicating the position of the first black band corresponds to the last column index for which the pixels are part of the black band for the first left black band and to the first column index for which the pixels are part of the black band for the first right black band, the image column furthest left of the image having the $1^{st}$ index (for example 0) and the image column furthest right of the image having the last index or the highest index (for example 1919). According to another variant, several first parameters are representative of a first black band, the first parameters belonging to a set of parameters comprising:

the parameters representative of the width of the black band (width in pixels or column index indicating the position of the black band), and the parameters representative of the video value of pixels forming a black band, for example the level of grey associated with each colour composing a pixel (for example red, green and blue).

According to a variant, the first parameter representative of a first black band of the stereoscopic image is not estimated but received with the stereoscopic image. The stereoscopic image comprises for example an information representative of the width(s) of the black band(s) or the information representative of the width(s) of the black band(s) is associated to the stereoscopic image. The information representative of the width(s) of the black band(s) takes for example the form of a metadata associated to the first and second images of the stereoscopic image, for example broadcasted from a broadcaster broadcasting the stereoscopic image. According to another example, the information representative of the width (s) of the black band(s) takes the form of a look-up table (LUT) indexed with the format of the stereoscopic image.

Then, during a step 52, a third image 22 is generated from the stereoscopic image by disparity compensated interpolation from first and second images forming the stereoscopic image. Depending on whether the first and second images comprise 0, 1 or 2 first black bands, the third image comprises zero, one or two second black bands, situated on the left and/or right of the third image. The second black band(s) of the third image are represented by one or several second parameters that are a function of the first parameter(s) respectively, that is to say that are determined from the first parameter(s). It the first black band(s) of reference images are represented by a first parameter corresponding to the width of the first black band(s), then the second black band(s) of the third image are shown by a second parameter corresponding to the width. It the first black band(s) of reference images are represented by a first parameter corresponding to the position of the first black band(s), then the second black band(s) of the third image are shown by a second parameter corresponding to the position. It the first black band(s) of reference images are represented by a first parameter corresponding to the video value of pixels of the first black band(s), then the second black band(s) of the third image are shown by a second parameter corresponding to the video value of pixels of the second black band(s). Advantageously, the disparity compensated interpolation is carried out using pixels of the useful part of each of the reference images, that is to say excluding the first black band(s) of reference images for which the black bands have been estimated. The information relating to the second black band(s) of the third image resulting from the disparity compensated interpolation from reference images is added at the end of the interpolation process. According to a variant, the interpolation is carried out on all the content of reference images, that is to say on the useful part of each of the reference images and on the first black bands of reference images. According to this variant, if for a given interpolated pixel the interpolation leads to a search for the video information in a first black band of reference images, then the video value of this pixel does not take account of the video value of the pixel of the reference image situated in the useful part of this reference image by excluding thus the pixel of the other reference image. According to this variant, the information relative to the second black band(s) of the third interpolated image is added at the end of the interpolation process.

The taking into account of first parameters representative of first black bands of reference images for the estimation of second parameters representative of second black bands if the third interpolated image offers the advantage of providing second black bands in the third interpolated image at clear borders (corresponding to the separations between the second black band(s) on one hand and the useful part of the third image on the other hand). In addition, the second parameter (s) representative of the second black band(s) of the third image are not based on the first parameter(s) representative of the first black band(s) of reference images, without interference with the useful part if reference images.

Advantageously, the second parameters representative of the second black bands are according to an item of information representative of the interpolation position between the first 20 and second 21 images. The information representative of the interpolation position corresponds to an interpolation factor, noted as a in equation 4. This factor is advantageously comprised between 0 and 1. According to a variant, this factor is fixed in advance and has a value of for example 0.5.

Advantageously, the disparity information associated with at least one of the reference images is advantageously received from a disparity estimator. According to a variant, the disparity information is received directly from the acquisition device having served in the acquisition of first and second reference images.

The steps of estimation 51 of at least a first parameter and of generation 52 of a third image by disparity compensated interpolation are advantageously reiterated for each stereoscopic image of a video sequence comprising several stereoscopic images, each stereoscopic image being formed from a first image and a second image, with which a disparity map is associated or not.

FIG. 6 shows a method for processing a stereoscopic image implemented in a processing unit 3 or 4, according to a second non-restrictive particularly advantageous embodiment of the invention.

During an initialisation step 60, the different parameters of the processing unit are updated.

Then, during a step 51, identical to that described with respect to FIG. 5, at least one first parameter representative of at least one first black band of the stereoscopic image is estimated.

Then during a step 61, an item of information representative of the disparity between the first image 20 and the second image 21 is determined. Advantageously, the disparity information is determined according to the first parameter of each black band detected in the first image 20 and/or the second image 21, that is to say the disparity information associated with the black bands is determined using equations 2 and 3, the disparity information associated with the useful parts 203, 213 of first 20 and second 21 images being determined by relying only on the useful parts 203, 213. Estimating the disparity by distinguishing the black bands on one hand and the useful part on the other hand offers the advantage of avoiding disparity estimation errors appearing when the pixel of a reference image is mistakenly placed in correspondence with a pixel of the useful part of the other reference image. According to a variant, the disparity estimation is carried out on all of the first and second images without making the distinction between the useful parts of images and black bands.

Finally, during a step 52, identical to that described with respect to FIG. 5, the third image 22 is generated by disparity compensated interpolation from first 20 and second 21 images forming the stereoscopic image.

Steps 51, 61 and 62 are advantageously reiterated for each stereoscopic image of a video sequence comprising several stereoscopic images, each stereoscopic image being formed by a first image and a second image, with which a disparity map is associated or not.

Naturally, the invention is not limited to the embodiments previously described.

In particular, the invention is not restricted to a method for processing images but extends to the processing unit implementing such a method and to the display device comprising a processing unit implementing the image processing method.

Advantageously, the stereoscopic image from which the third image is generated comprises more than two images, for example three, four, five or ten images, each image corresponding to a different viewpoint of the same scene, the stereoscopic image being then adapted to an auto-stereoscopic display. A third image is generated by disparity compensated interpolation from a pair of images of the stereoscopic image, generating a new viewpoint of the scene.

According to a variant, several third images are generated by disparity compensated interpolation from first and second images, particularly for an auto-stereoscopic display of the scene represented by the stereoscopic image. According to this variant, the interpolation factor α takes as many values as there are third images to be generated, for example the values 0.2, 0.4, 0.6 and 0.8.

The invention claimed is:

1. A method of processing a stereoscopic image, said stereoscopic image comprising a first image and a second image, at least one image from among said first and second images comprising at least one first lateral black band, wherein the method comprises:

generating a third image from said stereoscopic image by disparity compensated interpolation according to an interpolation coefficient (α), said third image comprising at least one second lateral black band, computing at least one second parameter representative of a width of said at least one second lateral black band by summing a product of (1−α) by a value associated with a first parameter representative of a width of a first lateral black band of the first image and a product of α by a value associated with a first parameter representative of a width of a first lateral black band of the second image, α being between 0 and 1, the second lateral black band of the third image, the first lateral black band of the first image and the first lateral black band of the second image being situated on a same lateral side of respectively the third image, the first image, and the second image.

2. The method according to claim 1, further comprising a estimating of the at least one first parameter representative of the width of said at least one first lateral black band.

3. The method according to claim 1, wherein a video value associated with the pixels of the at least one second lateral black band is a function of the interpolation coefficient (α) and of at least one video value associated with the pixels of the at least one first lateral black band.

4. The method according to claim 1, wherein the generating of the third image comprises determining an item of information representative of the disparity between the first image and the second image.

5. The method according to claim 4, wherein the information representative of disparity is determined according to the computed first parameters of the respective first and second images.

6. The method according to claim 1, wherein the first image, the second image and the third image each comprise a useful part, the useful part of the third image being generated by disparity compensated interpolation from the useful parts alone of said first and second images, the useful part of an image corresponding to the image from which any black bands have been removed.

7. The method according to claim 1, wherein the first parameters of the respective first and second images and the at least one second parameter correspond to the width expressed in pixels of a lateral black band or to a column index representative of the width of a lateral black band.

8. A device configured to process a stereoscopic image, said stereoscopic image comprising a first image and a second image, at least one image from among said first and second images comprising at least one first lateral black band, wherein the device comprises a memory and an interpolator configured to generate a third image from said stereoscopic image by disparity compensated interpolation according to an interpolation coefficient (α), said third image comprising at least one second lateral black band and further configured to compute at least one second parameter representative of a width of said at least one second lateral black band by summing a product of (1−α) by a value associated with a first parameter representative of a width of a first lateral black band of the first image and a product of α by a value associated with a first parameter representative of a width of a first lateral black band of the second image, α being comprised between 0 and 1, the second lateral black band of the third image, the first lateral black band of the first image and the first lateral black band of the second image being situated on a same lateral side of respectively the third image, the first image, and the second image.

9. The device according to claim 8, wherein the interpolator is further configured to compute the at least one first parameter representative of the width of said at least one first black band.

10. The device according to claim 8, further comprising a disparity estimator configured to generate an item of information representative of the disparity between the first image and the second image.

11. Display device comprising a device according to claim 8.

12. The device according to claim 8, wherein a video value associated with the pixels of the at least one second lateral black band is a function of the interpolation coefficient (α) and of at least one video value associated with the pixels of the at least one first lateral black band.

13. The device according to claim 10, wherein the information representative of disparity is determined according to the computed first parameters of the respective first and second images.

14. The device according to claim 8, wherein the first image, the second image and the third image each comprise a useful part, the useful part of the third image being generated by disparity compensated interpolation from the useful parts alone of said first and second images, the useful part of an image corresponding to the image from which any black bands have been removed.

15. The device according to claim 8, wherein the first parameters of the respective first and second images and the at least one second parameter correspond to the width expressed in pixels of a lateral black band or to a column index representative of the width of a lateral black band.

* * * * *